May 19, 1936.  R. CHILTON  2,040,830
VARIABLE SPEED TRANSMISSION MECHANISM
Filed May 3, 1933  6 Sheets-Sheet 4

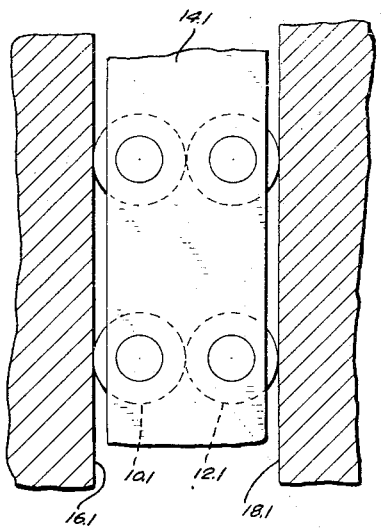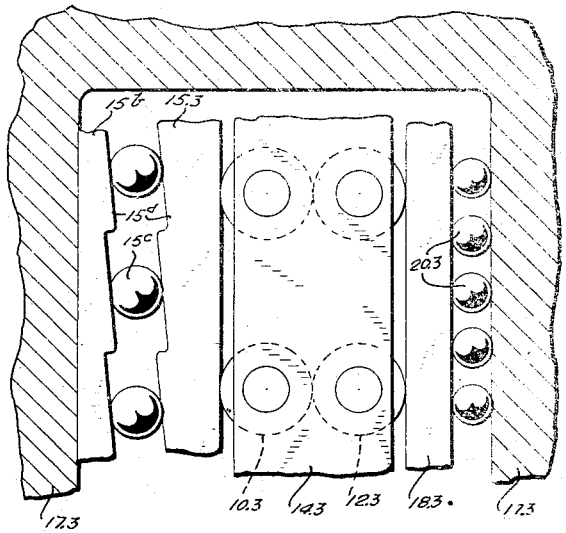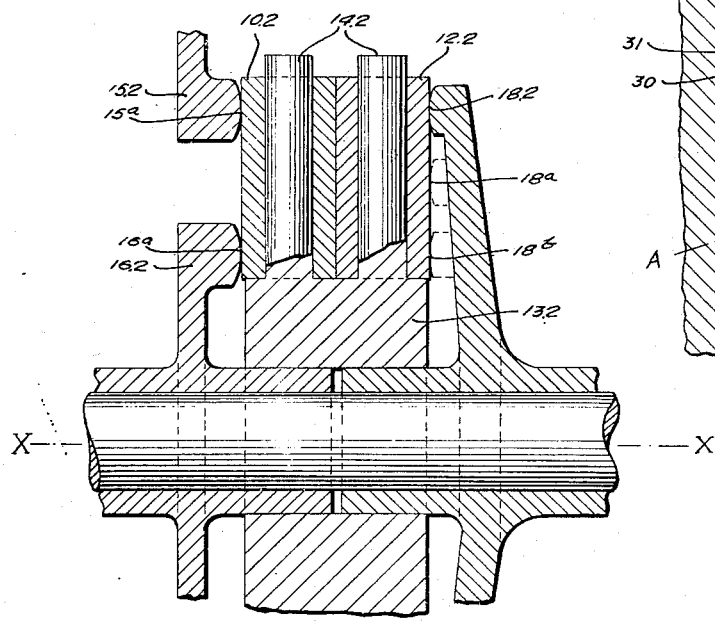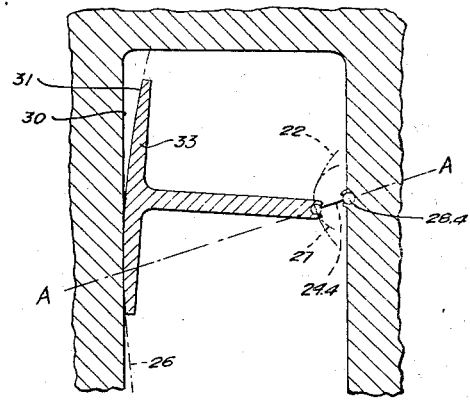

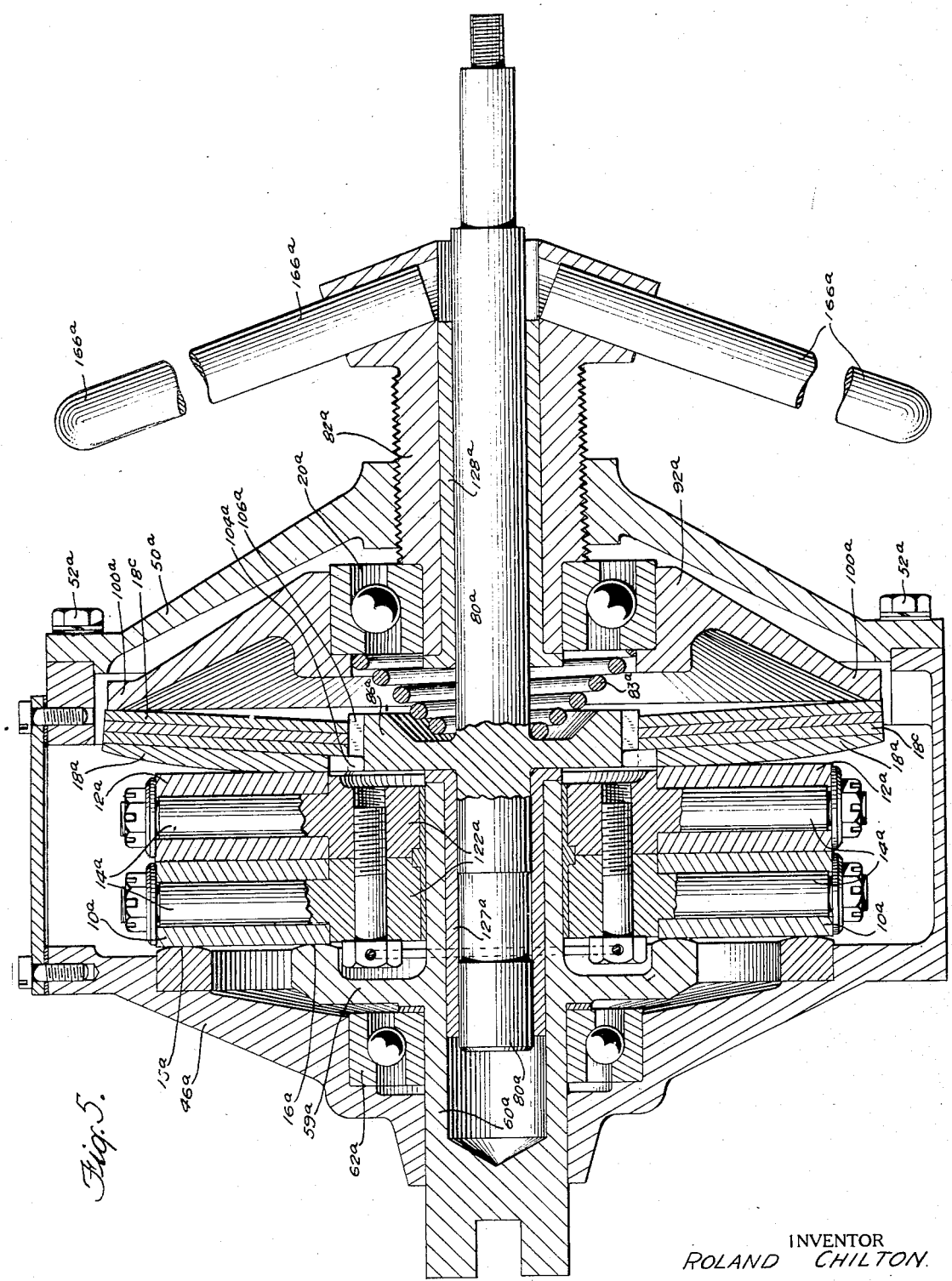

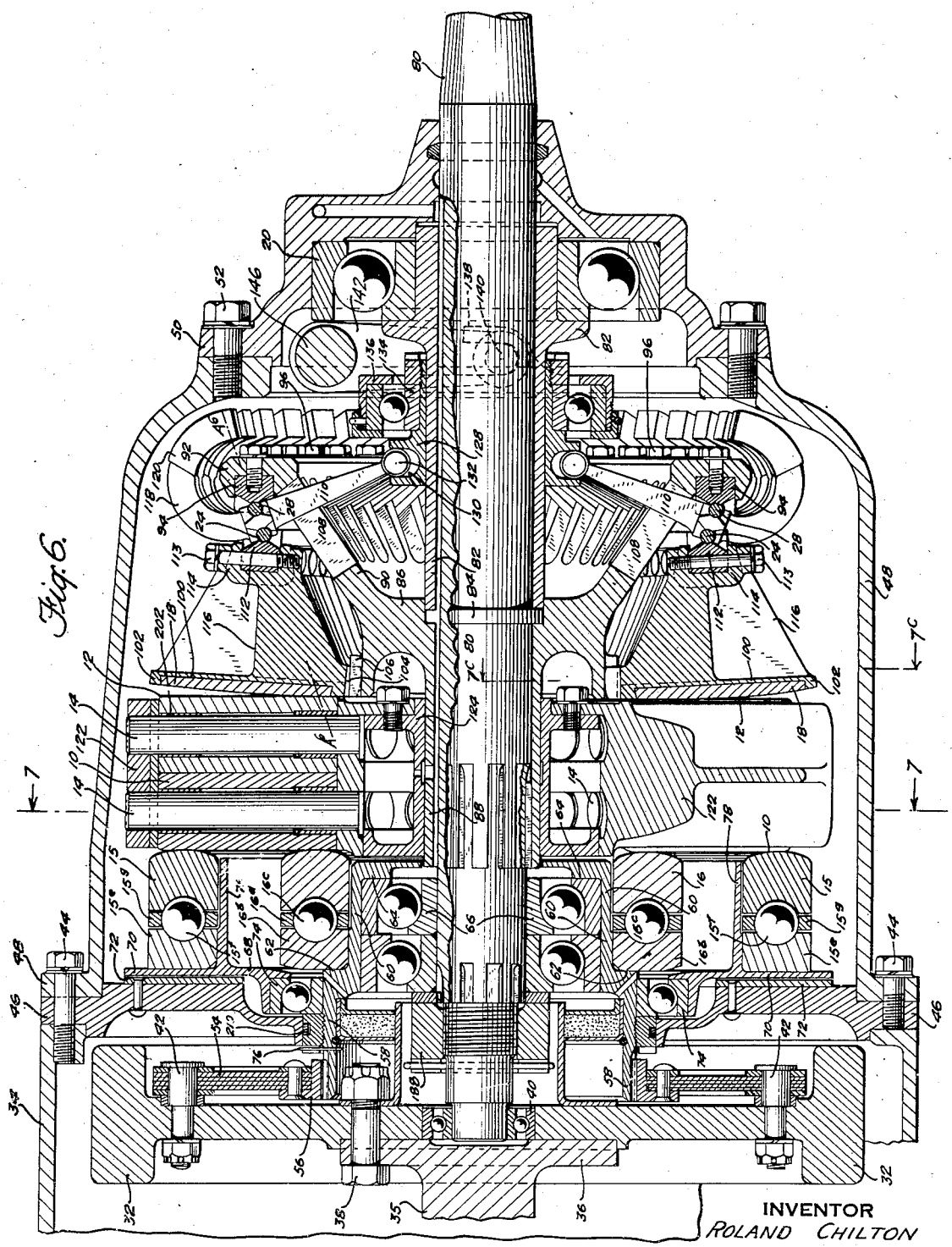

INVENTOR
ROLAND CHILTON
BY
ATTORNEYS

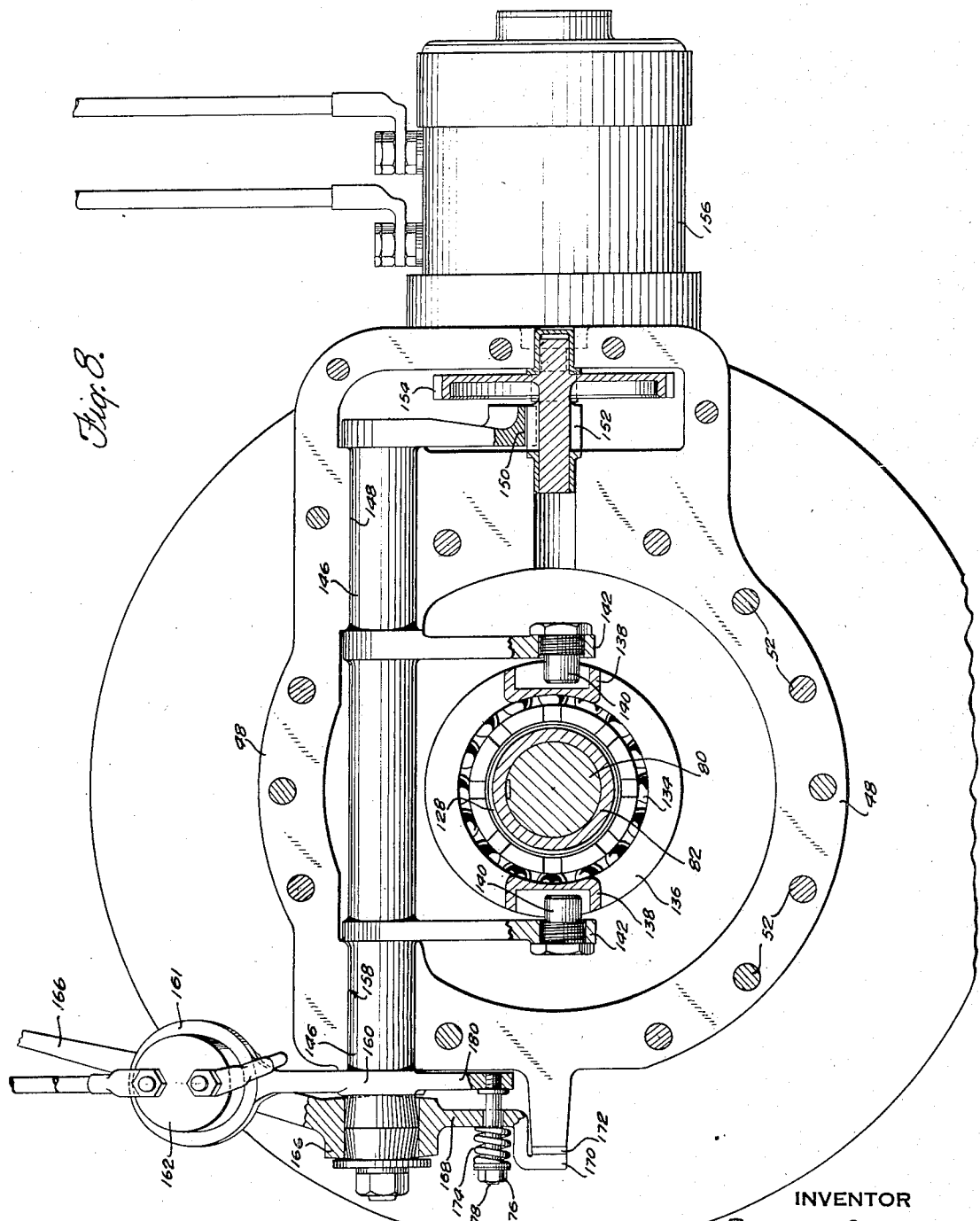

May 19, 1936. R. CHILTON 2,040,830

VARIABLE SPEED TRANSMISSION MECHANISM

Filed May 3, 1933 6 Sheets-Sheet 6

INVENTOR
ROLAND CHILTON
BY
ATTORNEYS

Patented May 19, 1936

2,040,830

UNITED STATES PATENT OFFICE 2,040,830

VARIABLE SPEED TRANSMISSION MECHANISM

Roland Chilton, Ridgewood, N. J.

Application May 3, 1933, Serial No. 669,144

95 Claims. (Cl. 74—281)

This invention relates to variable speed transmissions.

The invention relates particularly to improvements in variable speed transmissions of the rolling frictional contact type in which an infinite number of speed variations may be produced. Certain features of the invention are particularly adapted to be embodied in change speed mechanisms for use in automobiles. In the preferred form of the invention illustrated in this application, the invention is embodied in a mechanism adapted to replace the conventional automotive gear shift transmission and clutch.

The general objects of the invention are to improve the construction and mode of operation of transmission mechanisms of this type and to produce a transmission mechanism of this character in which an infinite number of speed changes may be effected with the avoidance of the difficulties and disadvantages inherent in prior mechanisms for producing these results.

Another object of the invention is to produce a transmission mechanism through which a driven member may be driven at various speed ratios including a 1 to 0 ratio and in which the driven member will be positively held stationary at the latter ratio while the driving member is running at any speed.

Another object of the invention is to provide a variable speed transmission mechanism by which the driven means may be brought to rest with the driving means running and may be smoothly started without the use of a clutch or other disengaging means and in which the mechanism will operate at any speed ratio without undue friction or loss of power.

Another object of the invention is to produce a novel and improved transmission mechanism in which the driven means may be driven at any speed within the ratio range with a positive control at all times of the driven means in changing from one speed ratio to another.

Another object of the invention is to produce a variable speed transmission in which the drive members will automatically assume unitary rotation about the axis of the mechanism with said members in non-rolling contact when brought to the 1 to 1 speed ratio.

The transmission of this invention is of a class employing rolling driving contact between members, certain of which are movable to vary the radius of contact and thereby vary the speed ratio. The rolling contact drive members operate in the presence of lubricant and the contact pressures required to prevent slippage may be, under certain conditions, many times the tangential driving effort to be transmitted. The rolling driving contact members are therefore made of hardened materials as in standard anti-friction bearing practice.

In mechanisms of the rolling driving contact type the required contact pressure at any contact varies as the driving load at that contact. In transmission mechanisms of this type, having a fixed driving ratio, torque-responsive contact pressure means has been provided which operates to prevent slippage at any load without involving unnecessarily high contact pressures and consequent low efficiency at light loads. In transmissions of this character in which the contact radius is varied to vary the speed ratio and the torque transmitted, the driving contact load required at any given torque varies inversely as the contact radius. Therefore, if the contact pressure is constant and the maximum contact radius for example is three times the minimum contact radius, a contact pressure which is adequate for the minimum contact radius will be three times that required at the maximum radius of contact. Such high contact pressures have limited the capacity of variable speed transmissions of the prior art and particularly those in which the pressures have been distributed over a relatively small number of contacts.

Another object of the invention is to provide a new and improved transmission mechanism of this type in which the contact loads at all times and under all conditions vary with the driving loads and preferably are proportional to the actual tangential effort imposed at the respective contacts.

Still other objects of the invention are to provide an improved transmission mechanism of the said type in which the parts may be easily moved relatively to effect the various speed changes while under full load regardless of the contact pressures and to produce a novel transmission mechanism of this type in which the driving effort and contact loads are distributed over a relatively large number of contacts.

With the above and other objects in view the invention consists in a transmission mechanism embodying the novel and improved features, constructions and combination of parts hereinafter described and particularly pointed out in the claims, the advantages of which will be readily understood and appreciated by those skilled in the art.

While the invention has been illustrated in this application as embodied in constructions in which an infinite number of variations in speed may be produced, certain features of the invention may be embodied in transmission mechanisms in which a limited number of changes in speed are effected.

The invention will be clearly understood from the accompanying drawings including diagrammatic views illustrating the mode of operation of the invention and constructional views illustrating a construction embodying the invention in its preferred form and a construction embodying the invention in another simplified form and the following detailed description of said drawings.

In the drawings, Fig. 1 is a diagrammatic explanatory view to illustrate the mode of operation of certain parts of the drive mechanism;

Fig. 2 is a diagrammatic view illustrating a construction embodying in relatively simple form certain features of the invention;

Fig. 3 is a diagrammatic explanatory view to illustrate the mode of operation of the torque responsive device and certain associated parts embodied in the preferred form of the invention;

Fig. 4 is a diagrammatic view illustrating the manner in which the mechanism for supporting and actuating the driven member in the preferred embodiment of the invention is developed;

Fig. 5 is a view in longitudinal section taken in a plane containing the axes of the mechanism illustrating a relatively simple construction embodying certain features of the invention;

Fig. 6 is a view in longitudinal section illustrating a construction embodying the invention in its preferred form and taken substantially on the line 6—6 of Fig. 7;

Segment A is a view illustrating the torque-responsive members with the associated driving and driven members removed;

Segment B is a transverse sectional view through the planet cage taken substantially in the plane of the line 7—7, Fig. 6, which contains the axes of the planetary rollers;

Segment C is a transverse sectional view taken substantially on the line 7c—7c, Fig. 6, through the arms of the driven member;

Segment D is a view in end elevation illustrating particularly the driven member with the pivot members removed;

Segment E is a view in end elevation illustrating particularly the driven member with the pivot members assembled therewith;

Segment F is a view in end elevation illustrating the driven member assembly.

Figure 7:
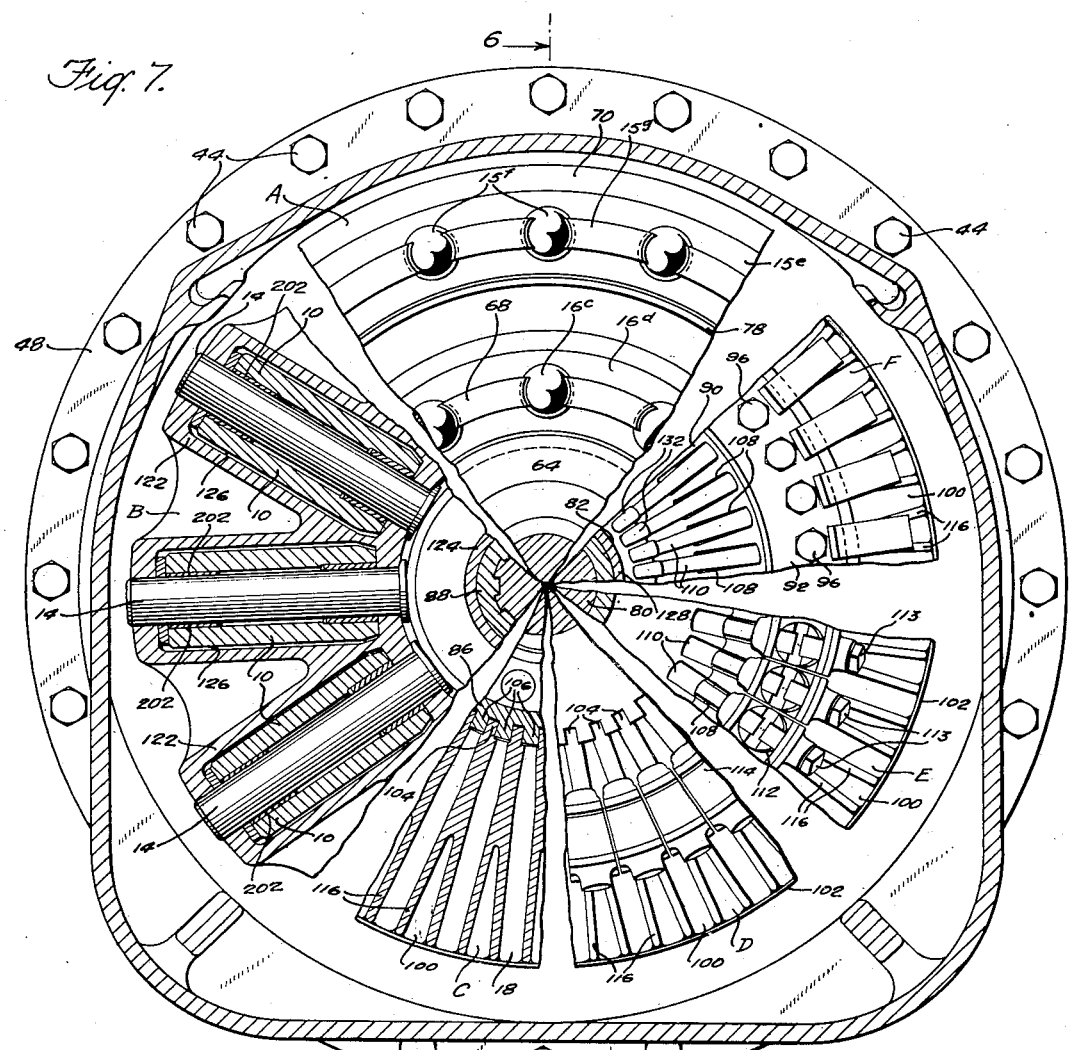
Figure 7 is a composite view comprising a transverse section through the housing taken substantially on the line 7—7 of Fig. 6, and fragmentary segmental views showing the interior mechanism as follows.
Figure 10:
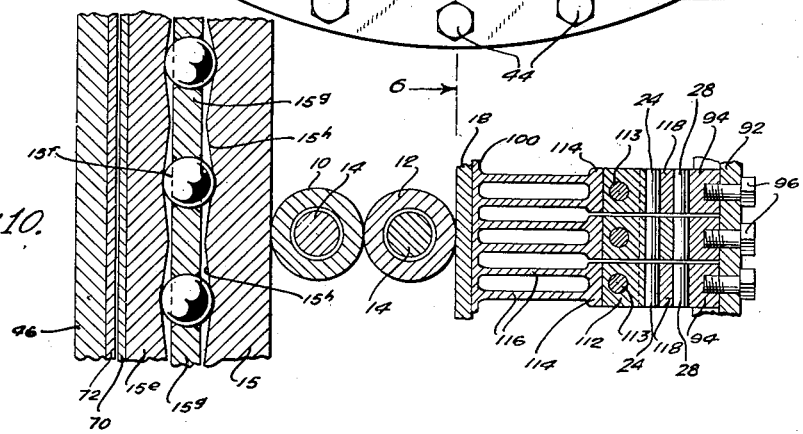
Figure 9:
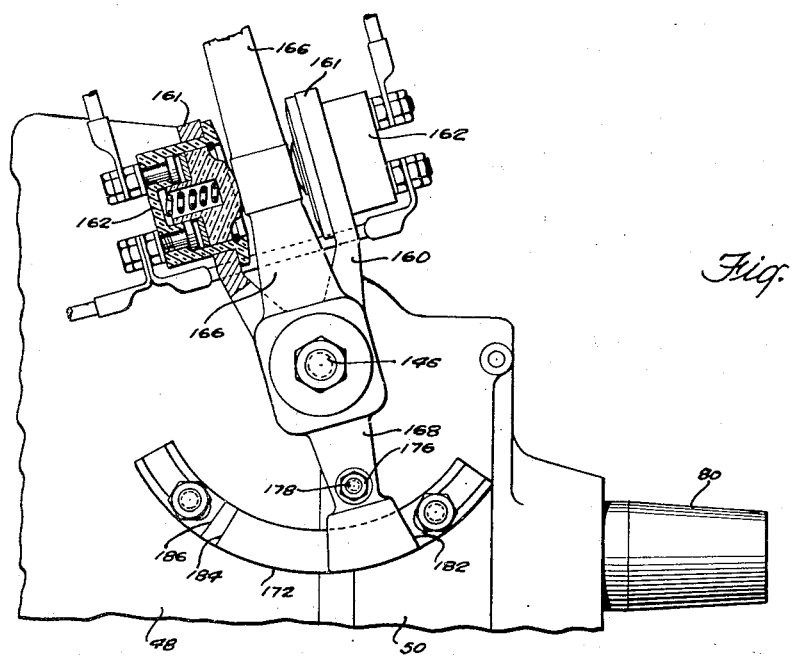
Figure 11:
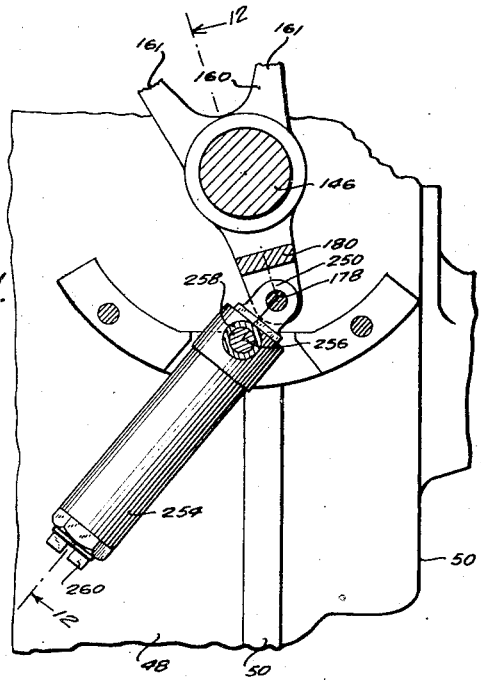
Figure 12:
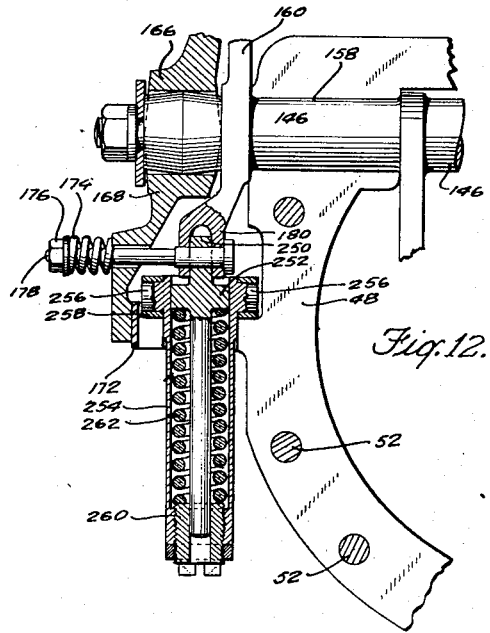

Fig. 8 is a view in end elevation of the transmission mechanism with the rear cover removed to show the control mechanism;

Fig. 9 is a view in side elevation of the transmission mechanism with the parts of the casing in place thereon and illustrating particularly the control mechanism;

Fig. 10 is a sectional view illustrating a development of the torque-responsive device and certain associated parts;

Fig. 11 is a detail view partly in side elevation and partly in section illustrating a modification of the control mechanism; and Fig. 12 is a sectional view of the construction shown in Fig. 11 taken substantially on the line 12—12 of said figure.

The diagram of Fig. 1 illustrates a pair of rollers 10.1 and 12.1 mounted upon parallel axes in a longitudinally movable frame 14.1 against relative lateral displacement of the roller axes and having their peripheries in rolling contact. These rollers are also in frictional driving contact with the inner surfaces of members 16.1 and 18.1 located on opposite sides of the roller and frame assembly. In such a construction and arrangement of parts, it will be seen that the roller and frame assembly may be moved longitudinally without moving the members 16.1 and 18.1 and that while contact pressure between said members and the respective rollers and between the rollers themselves sufficient to prevent slippage is maintained, the members will be held against relative longitudinal movement regardless of the state of motion of the roller assembly. In other words, the member 18.1 is constrained to unitary motion with the member 16.1 regardless of whether the roller assembly is in a state of rest or is in longitudinal movement and regardless of the velocity of the said movement. This elementary construction illustrates in straight line analogy the rotary relationship of certain parts in the novel construction of the present invention.

Figure 2 is a diagrammatic view illustrating a construction comprising rollers 10.2 and 12.2 mounted upon parallel axes on a carrier 13.2 having axles 14.2 secured to the carrier so as to be held against relative displacement. The carrier 13.2 is rotatable about an axis X—X thereby supporting the rollers for planetary rotation about said axis. These rollers are in rolling contact as shown clearly in this figure. An annular fixed member 15.2 having its center in the axis X—X engages the roller 10.2 adjacent the outer end thereof. An annular driving member 16.2 is mounted to rotate about the axis X—X and engages the roller 10.2 adjacent the inner end thereof.

When the driving member 16.2 is rotated about the axis X—X the rollers 10.2 and 12.2 and the carrier 13.2 which carries said rollers will planetize in the reverse direction about said axis at a speed relative to that of the driven member dependent upon the difference between the lengths of the respective radii of contact of the driving and driven members with the roller 10.2. When the contact radius of the driving member is one-half the contact radius of the fixed member the speed of reverse planetization will be equal to the forward speed of the driving member.

Considering now the line on the roller 10.2 joining the points of contact 15a and 16a respectively of the members 15.2 and 16.2 with the roller, it will be seen that at any instant, in the absence of slippage, the point 15a is fixed and the point 16a is moving about the axis X—X at the speed of the driving member while intermediate points in the line move at intermediate speeds varying with their positions relative to the points 15a and 16a. From the above explanation and the diagram Fig. 1 it will be seen that points in a line on the roller 12.2 complementary to the line 15a—16a have at all times exactly the same motion as corresponding points in the line 15a—16a.

A series of annular driven members 18.2, 18a and 18b mounted to rotate about the axis X—X may be arranged to contact with the roller 12.2 at different distances from said axis. It will be seen that a driven member such as 18.2 having a radius of contact with the roller 12.2 the same as the radius of contact of the fixed member 15.2 with the roller 10.2 will be held stationary regardless of the speed of the driving member 16.2 or of the roller assembly. Similarly a driven member such as 18b having a radius of contact with the roller 12.2 substantially the same as that of the driving member 16.2 with the roller 10.2 will be driven at the same speed as the driving member. Thus speed ratios of 1 to 0 and 1 to 1, respectively, are provided. When the radius of contact of the driven member is intermediate between that of the driving member 16.2 and that of the fixed member 15.2 the driven member will be driven at an intermediate speed, this speed varying inversely as the radius of contact of the driven member. When the radius of contact of the driven member is greater than that of the fixed member 15.2 the driven member will be driven in reverse direction while if the contact radius of the driven member is less than the contact radius of the driving member 16.2 the driven member will be driven at a speed greater than the driving member. If the driven member is provided with a construction by which the radius of contact of the same with the roller 12.2 may be varied longitudinally of the roller between the above points, the driven member may be driven at any speed within the range indicated above.

When the radius of contact of the driven member is the same as the radius of the driving member 16.2 there will be zero torque reaction on the fixed member 15.2 and the 1 to 1 ratio is absolutely unaffected by this fixed member. The 1 to 1 ratio is further unaffected by the state of the rollers 10.2 and 12.2, whether the said rollers are stationary or whether these rollers are planetizing about the axis X—X or by the speed of planetization of the rollers. The roller and axle assembly 10.2, 12.2, 13.2 and 14.2 will then automatically assume unitary rotation with the driving and driven members 16.2 and 18b because of the slight frictional resistance to rolling contact.

When driving contact pressures are imposed on the members 15.2, 16.2 and 18.2 it will be seen that the reaction from the member 18.2 is distributed between the fixed contact member 15.2 and the driving contact member 16.2 in proportion to the location of the point of contact of driven member 18.2 axially of the roller 12.2. In the direct drive position of the driven member as at 18b the entire pressure reaction is on the driving member 16.2 so that the fixed contact member 15.2 is automatically relieved of contact load in the 1 to 1 ratio position. This releases the rollers 10.2 and 12.2 for unitary rotation with the member 16.2 and 18.2 about the axis X—X in a 1 to 1 ratio giving "direct drive on high."

It is to be understood that the invention disclosed in Fig. 2 of the drawings may be embodied in a toothed gear transmission in which the members 15.2 and 16.2 and rollers 10.2 and 12.2 have intermeshing gear teeth and in which several toothed driven members having gear teeth arranged to engage the teeth of the roller 12.2 at points respectively corresponding to the contact positions 18.2, 18a and 18b are arranged to be selectively clutched to a driven shaft and such a construction is within the scope of the invention in its broader aspects.

In the preferred embodiment of the invention the drive is produced entirely by rolling contact between the rotary parts as in the structure disclosed in Fig. 2. In the said embodiment of the invention an annular driven member is employed having a convex or crowned surface which engages a series of rollers corresponding to the roller 12.2 and the variable contact radius is obtained by relatively tilting the driven member and the roller in directions transverse to the axes of the rollers. In the particular constructions shown in the drawings the crowned faced driven member is distorted to produce this relative tilting movement while the relation of the axes of the rollers to the axis of planetization remains unchanged.

Fig. 3 is a diagrammatic view illustrating the mode of operation of the torque-responsive device constituting a feature of the present invention. The construction shown in this figure comprises contacting rollers 10.3 and 12.3 mounted in pairs on parallel axes on a longitudinally movable frame 14.3. The rollers 12.3 are in rolling contact with a bar or member 18.3 mounted for longitudinal movement and the rollers 10.3 are in rolling contact with a member or bar 15.3 also mounted for longitudinal movement. The construction also comprises a bar or member 15b arranged to engage a contact face of the frame or housing indicated at 17.3 and a series of balls 15c interposed between the members 15.3 and 15b and arranged to engage sloping contact surfaces 15d formed on the opposed portions of said members. The member 18.3 is backed up by a series of antifriction bearing rollers indicated at 20.3 interposed between said member and the frame or housing.

In the construction shown in Fig. 3 any downward force exerted by the member 18.3 is transmitted through the rollers 10.3 and 12.3 to the member 15.3 and through the balls 15c to the member 15b. If the slope ratio of the contact faces 15d is one in twenty for example, a horizontal reaction of twenty times the vertical force exerted by the member 18.3 is produced. This reaction results in pressure of the members 18.3 and 15.3 against the rollers 10.3 and 12.3 respectively and in pressure of these rollers against each other and also in pressure of the member 15b against the frame, these pressures corresponding in magnitude to said horizontal reaction. These pressures vary with the force exerted by the member 18.3 but are always sufficient to prevent slippage at these contacts when the coefficient of friction is less than 20 to 1. The member 15b is thus locked against slippage under the force exerted by the member 18.3 provided the slope ratio of the inclined faces 15d exceeds the coefficient of friction. Despite any pressure that may be exerted at the contacts of the system the roller assembly is free to move between the members 18.3 and 15.3. When the downward force exerted by the member 18.3 is zero the contact pressures will all be zero and slippage may occur. To ensure that such slippage shall occur between the member 15b and the frame or housing instead of at the rolling contacts, means may be provided to exert at all times a light force tending to separate the member 15b from the contact face of the frame.

A structure analogous to that illustrated in Fig. 3 for varying the contact pressures in accordance with the force exerted by the member 18.3 is provided in the preferred embodiment of the invention for varying the contact pressures in accordance with the driving load. This structure is termed a "torque-responsive device". In said embodiment, however, the ball contacting members are given a double slope to obtain torque responsive action from a force exerted by a driving member in forward or in reverse direction.

The invention is illustrated in Figs. 6 to 11 inclusive as embodied in a transmission particularly adapted to be employed in an automobile to take the place of the conventional gear transmission and clutch. It is to be understood that the principal features of the invention illustrated in these figures are not limited in their application to a transmission mechanism for automobiles but that these features may be embodied in transmission mechanisms designed for other purposes.

Referring now to Figures 6 to 11, inclusive, 32 represents the flywheel of an engine of the type employed in automobiles having a housing 34 and a crank shaft 35 provided with a flange 36 to which the flywheel is secured by bolts 38. The flywheel has a pilot bearing 40 and is drilled for receiving studs 42, all the foregoing structure representing standardized automobile practice.

Secured to the housing 34 by the bolts 44 is the front transmission cover 46 and the main transmission housing 48 which is in turn provided with a rear cover 50 secured by bolts 52 and supporting the anti-friction bearing 20.

In permanent driving connection with the flywheel, preferably through a flexible driving disk 54, having a splined hub member 56, is a driving member assembly comprising the following elements: a tubular member 58 in splined engagement with the hub 56 and having an extension 60 of reduced diameter, a driving ring 16 fitted on said extension 60 for rotary movement relatively thereto, a complementary ring 16b tightly fitted on the extension 60 and abutting the shoulder 62 on the tubular member 58 and a series of balls 16c interposed between the rings 16 and 16b and held in spaced relation by a retainer 16d. The tubular member is provided with an inturned shoulder 64 forming an abutment against which the duplex antifriction bearing 66 is engaged.

The normally fixed member assembly comprises a support 68 rotatably carried on the tubular driving member 58 by means of the anti-friction bearing 74. This support member 68 is provided with a back plate 70 contactable with a friction facing 72 secured to the front cover 46. The bearing 74 is adjustable axially of the member 58 by the adjustment of the nut 76 threaded on the tubular member 58 and engaging said bearing. This nut is adjusted to adjust the support 68 to provide for a very slight clearance between the plate 70 and the friction facing 72 under zero load condition, the member 68 being distortable under any slight load to take up said clearance. The normally fixed member assembly also comprises a normally fixed driving ring member 15 mounted on the tubular extension 78 of the member 68 for rotary movement relatively thereto and a complementary ring 15e tightly fitted on said extension 78 and a series of balls 15f interposed between said rings and held in spaced relation by a retainer 15g. The balls 15f are arranged to engage sloping contact faces 15h on the respective rings 15 and 15e as shown in the developed sectional view of Fig. 10. The balls 16c are arranged to engage corresponding sloping contact faces formed respectively on the rings 16 and 16b.

The driven elements of the transmission include the main driven shaft 80 supported at its front end by the pilot-bearing 40 and at its rear end by the bearing 20 through the flanged sleeve 82 which abuts against the shoulder 84 formed on the shaft 80. Tightly splined onto the driven shaft 80 is the rigid driven member support 86 comprising the sleeve 88, the conical extension 90 and the rim 92 having a circular groove in which are secured by screws 96 the pivot members 94. The driven member proper comprises the distortable crowned plate 18 secured in an annular recess in the multiple armed distortable member 100 as indicated at 102. The member 100 is internally splined at 104 and slidably engages the splined extension 106 on the rigid supporting member 86. This member 86 is provided with a large number of slots 108 through which extend an equal number of control levers 110 equipped with pivot pins 28 and 24 by means of which each lever is pivoted respectively to one of the rigidly supported pivot members 94 and to the complementary pivot member 112. Each of the members 112 is secured by bolts 113 in the jaw 114 on the outer end of each of the arms 116 with which the member 100 is formed.

The diagram of Figure 4 shows the manner in which the construction for supporting the member 100 and for forming the contact face of the member 18 is developed. In this figure 22 indicates the cycloidal curve traced by a point in a part of a circle having a circumference 26 rolled upon a straight line 30. The central portion of this curve 22 as shown closely approximates a circular arc 27 having a center 28.4 fixed with respect to the line 30. In this diagram 33 indicates a rocking member having its outer end constrained to swing in the arc 27 by means of a link 24.4—28.4. If that part of the rocker adjacent the line 30 is held from lateral movement and the link 24.4—28.4 is oscillated through a relatively small angle about the fixed center 28.4, thereby rocking said rocker, the line 30 will generate a contact face 31 on the rocker having a curve closely approximating a circular arc. It will now be obvious that if a force is applied causing the line 30 to exert a pressure on the face 31 of the rocker 33 the rocker may be rocked along the line 30 without affecting this pressure or contact load and the rocker and link will be in stable equilibrium in all positions provided the rocker is held from vertical slippage. It will be noted that the contact point of the rocker face 31 with the line 30 is, in all positions of the rocker, in line with the link 24.4—28.4 as indicated by the line A—A.

The mechanism for supporting and actuating the member 18 is constructed in accordance with the diagram of Fig. 4. The centers of the pins 28 and 24 correspond with the points 28.4 and 24.4 in the diagram, the member 100 corresponds with the rocker 33 and the line of contact of the roller 12 with the member 18 corresponds with the line 30. The contour of the contact face of member 18 corresponds with the curve developed by line 30 on the rocker 33 when the rocker is rocked.

The roller assembly consists of a planet carrier 122 having a hub 124 freely rotatable on the sleeve 88 of the driven member support 86. The planet carrier is provided with two sets of radial cylindrical pockets 126 (Fig. 7) in which are rotatably supported the rollers 10 and 12 on the pins 14. The rollers 10 engage the driving ring 16 and the normally fixed ring 15 while the rollers 12 engage the distortable crowned annular driven plate 18, the spacing of the pins 14 being such that the rollers 10 and 12 are in rolling contact.

The control mechanism includes a collar 128 slidable axially on the sleeve 82 and having a groove 130 in which engage the rounded ends 132 of the levers 110. Secured on the control collar 128 is the anti-friction bearing 134 upon which is in turn secured the draw collar 136 provided with extensions 138 having slots in which engage pins 140 secured in the ends of the depending levers 142 (Figs. 6 and 8) fixed to the control rock shaft 146. The control rock shaft 146 extends through a suitable bearing 148 in the housing 48 and rear cover 50 and is provided with a toothed quadrant 150 meshing with a pinion 152 fixed to and preferably formed integral with the gear 154. A reversible electric motor 156 is provided with a pinion (not shown) engaging the gear 154. The rock shaft 146 also extends through a second bearing 158 and is provided with a lever 160 (Fig. 9) secured thereto and having spaced upwardly extending arms 161 carrying respectively a pair of opposed switches 162. Mounted for slight turning and rocking movement on the shaft 146 by the side of the lever 160 is a manually controlled lever 166 which extends upwardly between the switches 162 and is provided with a downwardly extending arm 168 terminating in a friction pad 170 engaging the fixed quadrant 172 under the pressure of the spring 174. This spring is mounted in a stud 178 secured in a downwardly extending arm 180 on the lever 160 and passing through an opening in the arm 168. The tension of this spring may be adjusted by a nut 176 threaded on the stud 178. The quadrant 172 is provided with stops 182 and 184 for limiting the movement of the lever 166 at the respective ends of the forward speed range and with a third stop 186 for limiting the movement of the lever at the higher speed end of the reverse speed range. The stop 184 is of less height than the stop 186 so that, by rocking the control lever 166 the pad 170 may be positioned to pass the stop 184. The stops 182 and 184 correspond respectively with the 1 to 1 and 1 to 0 speed ratio positions of the transmission mechanism and the stop 186 corresponds with the high speed reverse ratio position of said mechanism.

From the preliminary explanations already given in connection with Figures 1 to 4 inclusive the operation of the mechanism disclosed in Figures 6 to 10 inclusive will be readily understood. The transmission has been illustrated in the high gear position in which the contact of the driven member 18 is adjacent the inner ends of the rollers 12 opposite the contact of the driving member 16 with the rollers 10. The driven member is moved into this position from one of the outer contact positions thereof by a movement of the control sleeve 128 toward the right, Figure 6, by the actuation of the depending control levers 142 and associated parts. This movement is produced by a movement of the upper end of the manual control lever 166 toward the left, Fig. 9. Attention is called to the fact that, in this extreme position of the parts as well as in all other positions thereof the axis of the movable pivot pin 24 intersects the line A6—A6 (Fig. 6) joining the center of the pivot pin 28 with the point of contact of the driven member 18 with the roller 12. There will therefore be no reaction from the contact loads tending to displace the control levers 110, the entire system being in stable equilibrium as explained in connection with Figure 4.

In the position shown the entire contact reaction from the driven member 18 is transferred through the rollers 10 and 12 to the driving member 16 relieving the driven member 15 of all contact loads. The contact pressure in the high gear position is generated exclusively by the torque responsive balls 16c. The thrust reaction produced by the contact pressures exerted by the driving member 16 and on the driven member 18 in this position of the parts is taken by the following train of elements. From the member 16 the reaction is transferred through the torque responsive ball 16c to the member 16b and thence through the abutment shoulder 62 of the member 58 and through the antifriction bearing 66 to the nut 188 secured on the driven shaft 80. Thence the reaction is taken through the shaft 80 by the driven member support 86—90 which abuts against the projecting collar 84 on the shaft. The reaction is thence transferred through the pivot blocks 94, the pivot pins 28, the control levers 110, the pivot pins 24, the pivot blocks 112 and the arms 116 along lines A6—A6 to the driven member. Thus the bearing 20 and the fixed member assembly 15, 15f, 15e, and 68 is relieved of driving loads and the torque responsive balls 15f generate no contact reaction. Therefore the adjustment of the nut 76 maintains the contact face 70 of said member free from contact with the friction facing 72 and the entire fixed member assembly is freed from rotational restraint. As previously explained, this automatically frees all the rotary elements of the transmission and the bearing 66 for unitary nonrolling rotation about the main axis of the transmission so that there are no loaded rolling contacts at any point in the transmission when in high gear.

It will be seen that any movement of the control levers 110 toward the left, Fig. 6, will rock the crowned face of the member 18 in a direction to move the contacts of the plate with the rollers 12 outwardly away from the axis of the transmission. When the contacts of the driven plate with the roller are thus moved outwardly to positions opposed to points intermediate between the contacts of the driving member 16 with the rollers 10 and the contacts of the normally fixed member 15 with said rollers, the member 15 will receive its due proportion of the contact load and also of the driving reaction, which load and reaction will be balanced through the torque responsive balls 15f. The proportion of the contact load received by the member 15, the balls 15f and the member 15e will force the back plate 70 into contact with the friction face 72 thereby bringing the entire fixed member assembly to rest and the drive will be established through rolling contact in reduced ratio all as previously explained. As the movement of the control mechanism is continued to shift the contacts of the driven member with the rollers 12 toward the outer ends of the rollers the speed of the driven shaft will be gradually reduced while the shaft will be positively controlled in all positions of adjustment of the transmission. An infinite number of variations of speed of the driven shaft may thus be produced. When the control mechanism is adjusted to adjust the driven member in the 1 to 0 speed ratio position the contacts of the driven plate 18 with the rollers 12 are adjacent the outer ends of said rollers and are located in positions opposite the contacts of the fixed member 15 with the rollers 10. With the parts in these positions the driven shaft 80 will be held to zero rotation regardless of the speed of the driving member. Furthermore, the contact reaction will be exerted entirely upon the fixed member 15 and its associated parts as is appropriate to zero speed ratio in which the torque reaction is exerted exclusively on the fixed member. With this adjustment, there is no torque reaction exerted upon the driving member 16 except for the friction torque of the mechanism and the driving member is substantially relieved of contact load. The thrust reaction produced by the contact pressure exerted by the member 15 on the driven member 18 in the zero ratio position of the parts is taken by the following elements. From the member 15 the thrust is transferred through the torque responsive balls 15f to the complementary member 15e and through the back plate 70 to the front transmission cover 46. Thence the thrust is transferred through the bolts 44 and the housing 48 to the rear cover 50 and through the bearing 20 to the shouldered sleeve 82. Thence the thrust reaction is transferred through the collar 84 on shaft 80 to the driven member support 86—90 and thence through the elements 94, 28, 110, 24, 112 and 116 to the driven member.

The contact pressures in all forward speed ratios are automatically distributed between the members 15 and 16 in proportion to the driving reactions on each of these parts and the contact loads in the forward ratios are transmitted through the rollers 10 and 12 without imposing loads of the bushings 202 of the rollers 10 and 12, the entire planet carrier assembly being floated axially on the bearing hub 124. Thus in all forward ratios the only forces on the bushings 202 are those due to the tangential driving effort. This construction and arrangement of the parts constitutes one of the features of the present invention since it might be undesirable in normal operation to transmit the very high contact pressures through such bearings as the bushings 202.

While it is a feature of the present invention that the parts are so constructed and arranged that the relatively high contact pressures required in the adjustments of the transmission mechanism for certain speed ratios impose no reactions on the control mechanism, however, to avoid unduly rapid manual change of speed ratio and to overcome the frictional resistance of the control mechanism under these high loads, the movement of the control rock shaft 146 in the preferred form of the invention is produced by the electric motor 156 and the motor is controlled by the lever 166 in the following manner. When the lever 166 is urged forwardly or to the left, Fig. 9, the forward switch 162 is closed, thereby energizing the motor 156 and the motor turns the rock shaft 146 at relatively slow speed in the same direction. This motor operation continues as long as the operator follows up the motion of the shaft 46 with the lever 166. When the operator ceases to move the lever or releases the same, the lever will be held stationary by the friction of the pad 170 and the motor will be immediately switched off by the movement of the lever 160 affected by the rotation on the shaft 146 thereby opening up the forward switch 162 and deenergizing the motor 156. When the lever 166 is urged to the right, Fig. 9, the motor is thrown into operation by the closing of the right hand or rear switch 162 and the motor is energized to turn the shaft 146 in the reverse direction, the motor control mechanism operating in the same manner as when the control lever 166 is urged to the left.

In the zero speed ratio position the friction pad 170 on the manual control lever 166 abuts against the stop 184 on the quadrant 172. By rocking the upwardly extending arm of the lever 166 slightly to the right, Fig. 8, the pad 170 may be carried past the stop 184 and said arm of the lever may then be urged farther to the right, Fig. 9, carrying the point of contact of the driven member 18 outwardly beyond the point of contact of the normally fixed member 15. This will produce a rotation of the shaft 80 in reverse direction. In this occasionally used position of the parts some slight contact pressure reactions fall upon the bushings 202.

The principal function of the motor 156 is to overcome the friction due to the high loads on the pivot pins 24 and 28 when the speed ratio is changed while under heavy driving torque and to reduce the effort required by the operator in moving the lever 166. By the use of this motor and the control mechanism, therefore, the operator is required only to exert sufficient force on the control lever 166 to close one of the switches 162 and to overcome the friction at the quadrant 172.

In many kinds of service in which the transmission of this invention may be employed the resistance to movement of the mechanism for varying the speed ratio of the transmission will be so low that the shaft 146 may be readily moved manually. The driven member 18 is preferably so constructed that when in undistorted condition it contacts with the rollers 12 substantially midway between the ends of said rollers. In certain constructions in which the lever 146 is moved manually it may be desirable to balance the resistance to movement of the control shaft 146 and the mechanism connected therewith for distorting the driven member into either extreme position which resistance is exerted chiefly by the resistance of the driven plate 18 to distortion.

In the construction shown in Figs. 11 and 12 the downwardly extending arm 180 of the lever 160 is pivoted to the head of a plunger 250 mounted in a swinging sleeve 254 pivoted by means of trunnions 256 in bearings 258 carried on an extension of the housing 48 which supports the quadrant 172. A coiled spring 262 is mounted in the sleeve 254 and is interposed between the head of the plunger 252 and a bushing 260 threaded into the lower end of the sleeve, said bushing having a central opening through which the lower end of the plunger passes. The plunger is pivoted to the lever 160 by means of the stud 178 which carries the spring 174.

When the lever 160 is in a position such that the axis of the stud 178 and the axis of the trunnions 256 are in line with the axis of shaft 146, the spring 262 will impose no turning moment on the shaft 146. The parts are arranged to occupy these positions when the plate 18 is in its intermediate undistorted position in contact with the rollers 12 substantially midway between the ends of said rollers. When, however, the axis of the stud 178 is out of line with the axis of the shaft 146 and the axis of the trunnions 256, the spring will exert a turning moment on the shaft 146 tending to overcome the resistance to distortion of the driven plate 18.

In the preferred embodiment of the invention described above the following highly important advantages are secured: (a) At the 1 to 1 driving ratio all the parts of the transmission under load rotate in unitary non-rolling contact including the bearings 66. (b) The contact pressures are at all times proportional to the load transmitted at the respective contact points. Also the contact pressures vary not only in accordance with requirements at the various speed ratios but also in accordance with variations in the power input. (c) There are no reactions upon the speed ratio control mechanism, the overcoming of which is liable to fatigue the operator. (d) The undistorted position of the distortable driven plate is at substantially the mid point of its operating range. Therefore the maximum distortion of the plate required extends through only one-half this range. This enables a comparatively thick heavy plate to be employed without producing very heavy stresses in its distortion.

Fig. 5 shows a simplified construction embodying certain features of the invention which is of more general application. In this construction also the speed of the driven member may be varied from a condition of rest gradually and progressively through the various forward speed ratios up to unitary speed with the driven member or up to the limit of the forward speed ratio and through the various reverse speed ratios and may be held at any speed ratio intermediate between rest and the respective limits of the forward and reverse speed ratios.

In the simplified construction shown in Fig. 5 the transmission is provided with a fixed housing 46a and with a rear cover 50a secured to the body of the housing by bolts 52a. A fixed contact ring 15a is secured in any suitable manner in the housing and is engaged with the rollers 10a adjacent the outer ends thereof. A rotary driving ring 16a is arranged to engage the rollers 10a adjacent the inner ends thereof. The driving ring 16a is formed on a disc 59a secured to and preferably formed integral with a hollow driving shaft 60a mounted in bearings 62a carried by the housing 46a.

Arranged in opposed relation to the fixed and driving members 15a and 16a is a driven member 18a consisting of a distortable dished annular plate splined at 104a to the rim 106a of the disk 86a secured to and preferably formed integral with the driven shaft 80a. This distortable driven plate preferably is so constructed that it has the flexible and resilient properties of the well-known "Bellville" or dished washer type of spring now in use when high loads are encountered and moderate deflections are required. The driven plate is backed up on its outer side by a series of annular spring plates 18c. The outer of these plates is engaged adjacent its margin by a relatively rigid cone-shaped control member 100a having a hub 92a mounted on the antifriction bearing 20a. This bearing is carried by the sleeve 82a which is threaded into the rear cover 50a and is provided with arms 166a by which it may be rotated. The driven shaft 80a is rotatably mounted at its forward end in a bushing 127a secured in the hollow driving shaft 60a and at its rear end in a bushing 128a secured in the sleeve 82a. A spring 83a is interposed between the bearing 20a and the disk 86a which holds the shaft in position with the disk in engagement with the adjacent end of bushings 127a.

Mounted for free rotation on the shaft 60a are the rigidly united roller supports 122a having a number of radially arranged spindles 14a on which are journaled rollers 10a and 12a interposed between the driven member 18a and the driving and fixed members 16a and 15a, the rollers 10a being respectively in peripheral driving contact with rollers 12a. The rollers 10a engage the fixed and driven members 15a and 16a respectively adjacent the ends of the rollers. The driven member 18a is provided with a crowned contact face with which the rollers 12a engage.

The driven plate is distorted to rock the contact face thereof longitudinally along the rollers 12a by adjusting the cone-shaped member 100a longitudinally of the driven shaft. This adjustment is effected by rotating the sleeve 82a within its threaded bearing in the cover plate 50a.

In its free position, the dished driven plate 18a may have a greater angle of dish than in the high gear position in which it is shown in Fig. 5. As shown in this figure the radius of contact of said plate with the roller 12a is equal to the radius of contact of the driving member 16a with the roller 10a. The said plate is adjusted into the high gear position by rotating the sleeve 82a in a direction to adjust the member 100a toward the left, Fig. 5. The driven plate is constructed with or is given by the spring plates 18c such an angle of dish that when the plate is adjusted into high gear or 1 to 1 ratio position sufficient pressure will be developed to prevent slippage at the rolling contacts. In this position, the entire contact pressure reaction is exerted on the driving member 16a and the fixed member 15a is relieved of all contact load. The roller supports 122a with rollers 10a and 12a are therefore free to planetize about the shaft 60a in any direction and at any speed without affecting the 1 to 1 ratio. The roller assembly will therefore assume unitary rotation with members 16a and 18a because of the slight frictional resistance to rolling contact.

As the arms 166a are actuated to rotate the sleeve 82a and thereby move the sleeve, the bearing 20a and the member 100a toward the left, Fig. 5, the disk 18a is flattened, thereby moving its points of contact with the rollers 12a outwardly to reduce the speed ratio and increasing the contact pressure as is required by the higher torque exerted on the driven shaft at the lower-speed ratios. By continued movement of the sleeve 82a, the driven plate 18a may be distorted to bring the contact points of the plate with the rollers 12a opposite the points of contact of the fixed member 15a with the rollers 10a. This will reduce the speed ratio to 1 to 0 and the driven plate and the driven shaft will then be held stationary regardless of the speed of the driving member 16a and driving shaft 60a. With the parts in this position, the driving member 16a is entirely relieved of contact loads as is appropriate to the 1 to 0 ratio in which the driving force devolving upon the driving member 16a is 0.

When the driven plate 18a is further distorted in the same direction to carry the points of contact of the same with the rollers 12a outwardly beyond the contacts of the fixed member 15a, the driven plate and driven shaft will be driven at low speed in reverse direction.

When the sleeve 82a is adjusted back toward the right, the resilience of the plate 18a and the backing spring plates 18c will restore the plate thereby moving the points of contact of the plate with the rollers 12a inwardly. When these contact points are carried inwardly to positions within the points of contact of the fixed member 15a with the rollers 10a, the driven plate will be started easily and gradually at slow speed and a proportion of the contact load will fall on the driving member, 16a. The distribution of the contact load between the driving member 16a and the fixed member 15a will be substantially in proportion to the tangential driving reaction on each of these members throughout the entire forward speed ratio range.

It will be seen that for any given torque on a drive member the required contact pressure is reduced as the radius of contact is increased. Also, the required contact pressure increases as the torque increases and as the speed ratio increases toward the 1 to 0 ratio. At some point in the low speed high torque end portion of the speed ratio range the torque may reach the capacity of the driven means. In the case of a road vehicle this upper torque limit is set by the slipping point of the friction drive common to all wheel driven vehicles, i. e. the contact of the tire with the road.

It will be noted that in the constructions embodying the invention illustrated in the present application the contacts involved at the low speed high torque positions are adjacent the outer dimensions of the transmission and that the high speed low torque contact positions are located nearer the axis of the transmission, thus effecting an economy in the required contact pressures and giving the utmost capacity relative to the size of the transmission.

By the use of a transmission mechanism having a large number of driving contacts applicant has produced a mechanism which may be employed in place of the conventional gear transmission without requiring contact pressures sufficiently high to interfere with the efficiency of the mechanism or to subject the same to undue wear or injury of the contact surfaces. To illustrate, a concrete example may be taken of a transmission provided with eleven driving contacts having maximum radii of 1/3 of the driving wheel radius and having a 3 to 1 axle driving ratio. Such proportions are conveniently obtainable with the transmission of this invention and the tangential effort at each transmission contact will be $\frac{1}{11}$th of the tangential effort at the road contact. Then if the transmission contact loads are each merely equal to the load on the driving wheels the transmission will be capable of slipping the wheels as long as the coefficient of friction at each of the transmission contacts is more than $\frac{1}{11}$th of the value at the tires. The relative coefficients of friction between lubricated metal to metal rollers and of rubber tires on dry roads are within the order stated. It will therefore be seen that, with the large radius multiple driving contacts afforded in the embodiments of the invention disclosed in the application, the individual contact pressures at the several driving contacts will be of the order of the total load on the driving wheels which is a moderate loading for hard metal rollers of the proportions conveniently available in constructions embodying the invention.

It is to be understood that the invention is not limited to the particular constructions and arrangements of parts of the illustrated embodiments of the invention but that the invention may be embodied in other forms within the scope of the claims.

Having explained the nature and objects of the invention and having specifically described constructions embodying the invention, what is claimed is:—

1. A variable speed transmission mechanism including, in combination, a roller mounted for planetary rotation, a rotary driving member engaging said roller, a fixed member engaging said roller and having a planetary radius of contact different from that of said driving member and a roller radius of contact substantially the same as that of said driving member, and means driven from said roller, said roller being mounted on an axis substantially normal to the axis of said members.

2. A variable speed transmission mechanism including, in combination, a roller mounted for planetary rotation, a rotary driving member engaging said roller, a fixed member engaging said roller and having a radius of contact different from that of said driving member, a second roller mounted for planetary rotation with said first roller and in driving contact therewith, and driven means engaging said second roller.

3. A variable speed transmission mechanism including, in combination, a cylindrical roller mounted for planetary rotation, a rotary driving member bearing on said roller, a fixed member bearing on said roller and having a radius of contact different from that of said driving member, and means bearing on and frictionally driven by said roller, said means comprising parts relatively adjustable to adjust the speed at which one of said parts is driven.

4. A transmission mechanism including, in combination, planetary rollers mounted on axes radial to the axis of planetization of said rollers, driving, driven and normally fixed members in rolling contact with certain of said rollers, and control means arranged to vary the radius of contact of one of said members with the rollers.

5. A transmission including, in combination, a pair of planet rollers in rolling driving contact, driving and fixable members drivably engaged with one of said rollers respectively at different distances from the axis of planetization, and a driven member selectively engageable at different points along the length of the other roller.

6. A transmission including, in combination, a series of planetary substantially radially arranged rollers, driving and fixable members in rolling contact on one side of said series with certain of said rollers respectively adjacent the inner and outer ends thereof, and a driven member contactable on the opposite side of said series with other of said rollers selectively from their outer toward their inner end portions.

7. In a transmission, the combination of cylindrical rollers mounted for planetization about an axis and having the axes of the rollers intersecting the axis of planetization, and rotary driving and driven members each in rolling contact with certain of said rollers, the contact points of one said member with said rollers being radially shiftable toward and from the planetization axis.

8. In a transmission, the combination of cylindrical rollers mounted in substantially radial positions for planetization about an axis, and driving and driven members, one of which is shiftable in its relation to and both of which are in rolling contact with certain of said rollers, the points of contact of one said member with said rollers being shiftable in parallelism with the roller axes.

9. In a transmission, the combination of elongate cylindrical rollers mounted for planetization about an axis, and rotary driving and driven members each in rolling contact with the cylindrical outer surfaces of certain of said rollers, one of said members and the rollers engaged thereby being relatively adjustable to vary the radius of contact, toward and from the planetization axis.

10. A variable speed transmission including, in combination, a series of rollers mounted for planetary rotation, driving, driven and normally fixed members each in rolling contact with certain of said rollers, means for adjusting the speed ratio of the driving and driven members, and automatic means for holding the normally fixed member in fixed position at speed ratios other than the 1 to 1 ratio and for releasing said member and the rollers for unitary rotation with the driving and driven members at the 1 to 1 ratio.

11. In a transmission mechanism, the combination of an elongate roller arranged for planetary rotation, and an annular driven member contacting with said roller and distortable to vary the radius of contact along the length of said roller without affecting the contact pressure of said member on the roller.

12. In a transmission mechanism, the combination of a roller mounted for planetary rotation, an annular member having a convex surface contact with said roller, and means for distorting said member to rock said surface over the surface of the roller, engaged thereby to vary the radius of contact of said member with the roller longitudinally of the roller.

13. A variable speed transmission mechanism including, in combination, substantially cylindrical radial planetary rollers, driving and normally fixed members engaging said rollers, and a driven member opposed to said driving and fixed members and drivably engaging the rollers therebetween.

14. A variable speed transmission mechanism including, in combination, a series of planetary rollers having their axes substantially normal to the axis of planetization, annular members mounted to rotate about said axis and in rolling contact with said rollers and means to vary the radius of one of said contacts.

15. A transmission mechanism including, in combination, two superimposed series of planetary rollers, and annular members mounted to rotate about the axis of planetizaton and each in rolling contact with the rollers in one of said series.

16. A transmission mechanism including, in combination, planetary rollers, annular driving and fixable members having their axes coincident with the axis of planetization and having rolling contact with certain of said rollers respectively at different distances from the axis of planetization, and an annular driven member having rolling contact with certain of said rollers at variable distances from said axis.

17. In a variable speed transmission, the combination of rollers mounted for unitary rotation about an axis, an annular member for engaging said rollers distortable in a direction transverse to the general plane of said member to vary the radius of contact of the same with the rollers, and a series of spaced ribs extending from the outer face of said member.

18. In a variable speed transmission, the combination of rollers mounted for unitary rotation about an axis, an annular member for engaging said rollers distortable in a direction transverse to the general plane of said member to vary the radius of contact of the same with the rollers, a support rigidly held against movement in the direction of said axis, toggle levers intermediate said support and said member, and means for moving said levers to distort the member.

19. In a variable speed transmission, a planetary roller, a rocker having a convex contact face for engaging the roller, a support rigidly held against movement in the direction of the axis of planetization of the roller, and a link for connecting the rocker with said support, the contact face of the rocker being so formed that the rocking adjustment of the rocker produces directly no variation in the pressure of the rocker on the roller.

20. In a variable speed transmission, rollers mounted for planetary rotation and having their axes extending outwardly from the axis of planetization, and a member having rolling contact with said rollers selectively at variable points longitudinally of the rollers, said member being arranged to engage the rollers adjacent to the outer ends thereof to produce a 1 to 0 speed ratio and to engage the rollers adjacent to the inner ends thereof to produce a 1 to 1 speed ratio.

21. In a variable speed transmission mechanism, the combination of rollers mounted for planetary rotation, driving and normally fixed members respectively in rolling contact with certain of said rollers at different distances from the axis of planetization, a driven member in rolling contact with certain of said rollers, and torque responsive devices for causing said members each to exert a contact pressure on the rollers in proportion to the driving load thereon.

22. In a variable speed transmission mechanism, the combination of planetary rollers, members engaging certain of said rollers at different distances from the axis of planetization, a driven member engaging certain of said rollers at variable distances from said axis, and torque responsive means for causing said members to exert contact pressures on said rollers variable with the relative adjustment of said driven member and the rollers.

23. In a transmission mechanism, the combination of two concentric members, one of which is mounted for rotary movement, a third member co-axial with and axially opposed to said first members, and planetary rollers in rolling driving contact with said members, the roller axes, in each instance, intersecting the axis of planetization.

24. In a transmission mechanism, the combination of two concentric members, one of which is a rotary member, a third rotary member co-axial with and axially opposed to said first members, and planetary rollers in rolling driving contact with said members, one of said members being adjustable to vary its radius of contact with the rollers.

25. A transmission mechanism including, in combination, a series of cylindrical radial planetary rollers, certain of which are in rolling contact one with another, driving and driven members engaging the peripheries of certain of said rollers, and a reaction member engaging the peripheries of certain of said rollers.

26. A variable speed transmission mechanism including, in combination, a series of radial planetary rollers, driving and driven members engaging the peripheries of certain of said rollers, a reaction member engaging the peripheries of certain of said rollers, and means by which one of said members and the rollers engaged thereby may be relatively adjusted to vary the radius of contact of said member with the rollers.

27. A transmission mechanism including, in combination, a series of planetary radial rollers having their axes substantially perpendicular to the axis of planetization, driving and driven members engaging the peripheries of certain of said rollers, and a fixed member engaging the peripheries of certain of said rollers.

28. A transmission mechanism including, in combination, a driving member, a driven member, a floating support, and mutually contacting rollers mounted on said support for drivably connecting the driven member with the driving member.

29. A transmission mechanism including, in combination, a driving shaft, a driven shaft, a support freely rotatable with relation to said shafts, and rollers having line driving contact one with another mounted on the support for transmitting rotation from the driving shaft to the driven shaft.

30. A transmission mechanism including, in combination, a floating carrier, elongate planetary rollers mounted on radially extending axles secured to said carrier, driving and driven members engaging the peripheries of certain of said rollers, and a reaction member engaging the peripheries of certain of said rollers.

31. A transmission mechanism including, in combination, planetary rollers, certain of which are arranged in rolling driving contact one with another, driving and driven members engaging the peripheries of certain of said rollers, a reaction member engaging the peripheries of certain of said rollers, and means for supporting the rollers for planetary rotation independently of the driving and driven members.

32. A variable speed mechanism including, in combination, planetary rollers, certain of which are in rolling driving contact one with another, driving and driven members engaging the peripheries of certain of said rollers, a reaction member engaging the peripheries of certain of said rollers, means for supporting the rollers for planetary rotation independently of the driving and driven members, and means by which one of the members and the rollers engaged thereby may be relatively adjusted to vary the radius of contact of said member with the rollers.

33. A variable speed transmission, substantially cylindrical planet rollers axially intersecting a co-axis, coaxial driving and fixed members having roller driving contacts located with respect to the intersection on pitch cones of different angles, and a driven annular member having roller driving contact variable through a range including said pitch cone angles.

34. A variable speed transmission including, in combination, radially arranged substantially cylindrical planet rollers having co-planar axes of rotation, a driving member having one roller drive ratio, a second member having another roller drive ratio, and a driven member having roller drive ratios variable between said first and second ratios.

35. A variable speed transmission including, in combination, cylindrical rollers axially intersecting an axis of planetization, two members having roller driving contacts such that lines therethrough from the intersection form different angles with said axis, and a third member having variable roller contacts such that lines therethrough include said angles.

36. A variable speed transmission including, in combination, cylindrical rollers axially intersecting an axis of planetization, two members having roller driving contacts such that lines therethrough from the intersection form different angles with said axis, and a third member having variable roller contacts such that lines therethrough include said angles, said members including a reaction member, a driven member and a driving member.

37. A variable speed transmission including, in combination, planet rollers of substantially uniform radius throughout the lengths thereof, two members having different radii of roller contact with relation to the axis of planetization, and a third member having a variable radius of roller contact with respect of said axis.

38. A variable speed transmission including, in combination, planet rollers of substantially uniform radius throughout the lengths thereof, two members having different radii of roller contact, and a third member having a radius of roller contact variable through a range including said radii.

39. A variable speed transmission including, in combination, planet rollers of substantially uniform radius throughout the lengths thereof, two members having different radii of roller contact with relation to the axis of planetization, and a third member having a variable radius of roller contact with relation to said axis, said members including a control member, a driving member and a driven member.

40. A variable speed transmission including, in combination, a pair of planet rollers extending radially of a main axis and connected for reverse rotation on their radial axes, an annulus drivably engageable with one of the rollers at various points axially along the same, and a driving means engageable with one of the rollers of said pair.

41. In a variable speed transmission, the combination of a planet roller mounted for rotation about a radial axis having a substantially unvarying angular relation to the axis of planetization, and an annular disk having a crowned contact relation with the roller and distortable conically to shift the contact along the roller.

42. In a variable speed transmission mechanism, the combination of a roller, a relatively thin annular disk having a crowned surface contact relation with the roller, and a relatively thick disk carrying member comprising a plurality of segments individually rigid but collectively distortable for rocking action over said surface contact.

43. In a variable speed transmission mechanism, the combination of a planetary roller, an annular plate having a contact face rockable along the roller, contact pressure means, and control means arranged to distort the plate to effect the rocking thereof without moving said contact pressure means.

44. In a variable speed transmission mechanism, the combination of a roller, a substantially rigid thrust reaction member spaced from the roller, an annular plate rockably engaging the roller, and control means between the thrust reaction member and the plate movable to effect the rocking of the plate and arranged to transmit said thrust and to remain in stable equilibrium throughout said movement.

45. In a transmission, in combination, a roller mounted for planetization about an axis, and a driving and a driven means, one of which is radially shiftable toward and from the planetization axis and both of which are in rolling contact with said roller.

46. In a transmission mechanism, a driving member, a driven member axially opposed to the driving member, and a driving connection between said driving member and said driven member including a pair of mutually contacting rollers, one of which is in rolling contact with said driving member and the other of which is in rolling contact with said driven member.

47. In a transmission mechanism, a driving member, a driven member, and a driving connection between said driving member and said driven member including a pair of elongate planetary rotatable members having mutual contact subtending said elongation, the roller and member axes being in substantially rectangular relationship.

48. In a transmission mechanism, a driving member, a driven member, and a driving connection between said driving member and said driven member including a pair of mutually contacting elongate planetary rotatable members of uniform diameter throughout.

49. In a transmission mechanism, a driving member, a driven member, and a driving connection between said driving member and said driven member including a pair of elongate planetary rotatable members having mutually contacting end portions of substantially similar form.

50. In a transmission mechanism, in combination, a roller, and an annular member profiled for rocking contact with said roller, said member being distortable for rocking action though rigid against any profile change.

51. In a transmission, in combination, a roller, and an annular member contactable with said roller and elastically distortable to include a coplanar relationship between its inner and its outer peripheries.

52. In a transmission, in combination, a rotatable member, and an annular disc having a limited curvature of profile such that a radially straight line is contained within the disc cross section, said disc having one face thereof in rockable driving contact with said rotatable member.

53. In a transmission, in combination, a rotatable member, a disc mounted for rotation on a fixed axis and having a curved contact face bearing on said member and a substantially rectilinear back, and means operable to rock said disc in its relation to said member.

54. In a transmission, in combination, an elongate roller, and an annular disc drivably contacting with said roller and distortable from a flat condition on one side thereof to rock said contact lengthwise the roller surface.

55. In a variable speed transmission, a member adapted to be rotated, and an annular disc engageable with and driven by said member, said disc being rigid as to cross-sectional form but distortable for opposite angulation of its diametrically opposed cross sections.

56. A variable speed transmission including, in combination, a rotatable member, an annular disc having a face profiled for rocking contact with said rotatable member, and means to reinforce said disc against change in profile, the whole being elastically distortable to admit of said rocking.

57. In a variable speed transmission, in combination, a roller, and an annular member rigid as to cross-sectional form rockably contacting said roller, said member being elastically distortable for equal and opposite angulation of its diametrically opposed cross sections.

58. In a transmission, in combination, an elongate roller, and an annular disc having a rocking contact relationship with said roller, said disc being flexible for approach and recession of its inner and its outer peripheries toward and from the opposite ends respectively of said roller.

59. In a transmission, in combination, a disc, a plurality of elongate rollers organized for contact with and planetization about the axis of said disc, and means operable to effect rectilinear movement of the contact points lengthwise said rollers by axially distorting said disc.

60. In a transmission, in combination, planetary rollers, three co-axial members having rolling contact with one or more of said rollers at respectively large, small and adjustable radii from said axis, said rollers being mounted on axes substantially normal to the axis of said members, and driving, driven and fixed means engaging one each of said members.

61. In a transmission, in combination, elongated rollers mounted for planetization about an axis, and three members concentric with said axis, said members having roller driving contacts at respectively large, small and adjustable radii, one of said members being axially opposed to the other two.

62. In a transmission, in combination, planetary rollers, two members having rolling driving contacts with certain of said rollers at respectively large and small radii, a third member having rolling contact with certain of said rollers adjustable to include said radii, and driving means for the first said members, each adapted to generate torque-responsive loads, the whole being so organized that the sum of said loads reacts upon the third member contact.

63. In a transmission, in combination, an annular disc, planet rollers with which said disc is engageable for rocking shift of the contact thereacross at large, small and intermediate radii, members drivably connected with the rollers at corresponding radii, and means adapted to apply to one of said members contact pressures varying with the driving torque on the other said members whereby the rocking system is in stable equilibrium in all positions and under all driving loads.

64. In a transmission, in combination, members in driving contact one with another at respectively large, small and adjustable radii, and means to generate contact loads in proportion to the torque on certain of said members, the members themselves being so related that said loads react cumulatively on the adjustable contact.

65. In a transmission, in combination, a driving member, a driven member, a fixed member, planet rollers in rolling contact with said members, and means adapted to apply contact pressure to one of said members proportional to the sum of the torque loads on the other two members, said means including a disposition wherein one member faces another with the rollers in between.

66. In a transmission, the combination with a member engageable with and rockable with respect to a second member for contact shift from one to the other end thereof, of means adapted to apply equilibrium pressures to the respective ends of one said member throughout said rocking, and control means adapted to set the ratio between said equilibrium pressures.

67. In a transmission, in combination, a rocker member, means urged to movement to load said rocker member, and rocker control means organized to transmit said load and to prevent said movement during rocking.

68. In a transmission, in combination, planetary rollers, and a member concentric with the axis of planetization, said member having rolling driving contact with one or more of said rollers, the contacting faces being profiled for coplanar shift of said contact, said rollers having a rectangular axial relationship with the axis of planetization.

69. The combination with a radial planetary roller and a member rockably engaged therewith for ratio changing contact shift between its inner and outer margins, of cam means adapted individually to apply torque-responsive pressures to the respective margins, and means to control the rocked relation of said members.

70. In a transmission, in combination, a first member engageable with and rockable with respect to a second member for shift of the contact point between large and small circumferences of rolling contact on one of said members, and torque-responsive pressure contact means individually effective at the respective circumferences.

71. In a transmission, in combination, a member engageable with and rockable with respect to a second member for shift of the contact point therebetween from one extreme to another, two contact load means individually adapted to rock the rockable member to the respective extremes of contact position, means to control the proportion of pressure generated by each contact load means, and means to control the shifted position of the rockable member anywhere between said extremes.

72. In apparatus of the class described, in combination, a rocker comprising a ratio changing shiftable contact transmission drive member, contact pressure means effective toward the respective ends of said rocker, said pressure being generated by torque-responsive means, and means to control the pressure relationship.

73. A transmission including a transmission member engageable with and rockable with respect to a second member for contact shift from one to the other end thereof, rings drivably connected with the respective ends of one said member, and means to apply contact pressure to each of said rings proportionate to the respective driving torques, the whole being so organized that the torque relation between said rings is proportionate to the location of the shiftable contact relative to the ends of said member whereby the entire system is in stable equilibrium in all positions and under all driving loads.

74. In a transmission, in combination, an annular disc, a roller with which said disc is engageable and with respect to which it is rockably related for contact shift between the opposite ends of said roller, and contact pressure means individually effective at the roller ends.

75. In a transmission, an annular disc, a roller with which said disc is engageable and with respect to which it is rockably related for contact shift between the inner and outer peripheries of said disc, and contact pressure means individually effective at the inner and outer peripheries respectively of said disc.

76. In a transmission, an annular disc, a roller with which said disc is engageable and with respect to which it is rockably related for contact shift between the inner and outer peripheries of said disc, and contact pressure means individually effective when the contact point is shifted to one or the other of said peripheries, the contact pressure means being collectively effective upon said contact when in an intermediate position.

77. In a transmission, in combination, a roller and a disc engageable with and rockably related thereto for approach and separation of associated ends and peripheries thereof respectively, means adapted to convert circumferential driving effort into axial thrust urging said approachments, and control means adapted to maintain the circumferential status at said pressure means whilst effecting said approach and separation notwithstanding the fact that said last mentioned movements are variably related.

78. In a transmission, in combination, a housing member, driving and driven members contained within said housing, cylindrical rollers drivably connecting the driving and driven members and axially normal thereto, and a roller carrier free for rotation with respect to all of said members.

79. A transmission including, in combination, rollers, a rotationally floating carrier for said rollers, a member having a radius of roller contact variable of the member axis, a member having a fixed radius of roller contact, and torque-responsive means associated with the last said member and adapted to load both said contacts.

80. In a transmission, in combination, a driving member, a driven member, a normally stationary member, means including a thrust bearing axially locating the driving member with respect to the driven member, and means including a thrust bearing axially locating the fixed member with respect to the driven member.

81. A transmission including, in combination, an annular disc, members opposed to the inner and outer portions of said disc, a roller assembly drivably contacting said members and said disc, means to shift the disc contact to be opposite either of said member contacts, the whole organized for unitary rotation of the disc with the member whose contact is opposed, and thrust bearings restraining the members against axial separation from the disc and disposed so as to partake of said unitary rotation.

82. In a transmission, two sets of radially disposed rollers, said sets of rollers being drivably connected and the driving connection in each instance being effective toward the roller ends.

83. In a transmission, a disc, and a roller symmetrical about its mid length rockably contacted with said disc for simultaneous shift of the contact lengthwise the roller and crosswise the disc.

84. In a transmission, in combination, a pair of drivably connected planet rollers, and a driving, driven and fixed member respectively having roller contact, the radius of contact of one said member contact being adjustable between the radii of the other two.

85. In a transmission, in combination, a roller, and an annular disc having a convex contact relationship with said roller, said disc being distortable from a normal condition in which its inner and its outer peripheries are coplanar.

86. In a transmission, in combination, an annular disc, and a plurality of rollers axially radial of the disc and rockably contactable anywhere across the face of said disc, said contacts having at all times a coplanar relationship.

87. In a transmission, in combination, a disc, a plurality of rollers axially radial of the disc and contacting said disc, and means whereby said rollers may planetate about the disc axis and have radial but not axial movement of the point of contact.

88. In a transmission, in combination, a pair of planet rollers each having a length greater than its diameter, said rollers having mutual contact adjacent to the opposite roller ends.

89. In a transmission, in combination, a planet roller, a disc having a rockable contact relationship with said roller, means to carry the roller and the disc, and control means to effect said rocking action without relative axial displacement between said carrier means.

90. A transmission including variably contactable rotating members, one of which is an annular disc elastically distortable from a coplanar relationship between its inner and its outer peripheries.

91. In a transmission, opposed drive members rockably related, a torque-responsive means, and means to control said rocking proportioned to maintain the whole in stable equilibrium in all rocked positions of contact between said members without subjecting said torque-responsive means to movement.

92. In a transmission, in combination, a transmission housing, a disc and a pair of axially parallel drivably connected rollers radial of the disc axis mounted within said housing, said disc and rollers being subject to varying speed and contact load, and two thrust bearings adapted to transmit said load between said discs and to said rollers, said bearings being so related to said disc and rollers and said housing as to be each subject to minimum relative load when subject to maximum relative speed.

93. In a variable speed transmission, in combination, members connected for relative torque and speed variation, means to maintain contact loads on each member proportional to the torque, and thrust bearings for said members adapted to resist the contact loads, the bearing arrangement being such that the load and speed to which each is subject vary in inverse proportion.

94. A transmission including, in combination, an annular disc, drive means opposed to said disc, axially parallel paired rollers drivably contacting said means and said disc for rocking contact shift along at least one roller of each pair, and means to apply equal and opposite pressures on said contacts.

95. The combination with a disc, of a pair of axially parallel drivably connected rollers radial of the disc axis, said disc and rollers being rockably related for contact shift along one of said rollers, and means drivably contacting the other of said rollers.

ROLAND CHILTON.